(12) United States Patent
Dai

(10) Patent No.: US 8,432,507 B2
(45) Date of Patent: Apr. 30, 2013

(54) ATTACHMENT FRAME FOR A DISPLAY MODULE AND PORTABLE ELECTRONIC DEVICE USING THE SAME

(75) Inventor: Bin Dai, ShenZhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 179 days.

(21) Appl. No.: 12/961,695

(22) Filed: Dec. 7, 2010

(65) Prior Publication Data

US 2012/0044435 A1    Feb. 23, 2012

(30) Foreign Application Priority Data

Aug. 18, 2010 (CN) .......................... 2010 1 0256324

(51) Int. Cl.
*G02F 1/1333* (2006.01)
(52) U.S. Cl.
USPC ............................................................ 349/58
(58) Field of Classification Search ............... 349/58
See application file for complete search history.

(56) References Cited

U.S. PATENT DOCUMENTS

| | | | |
|---|---|---|---|
| 6,525,790 B1 * | 2/2003 | Kan-o | 349/58 |
| 6,828,721 B2 * | 12/2004 | Wakita | 313/491 |
| 7,304,837 B2 * | 12/2007 | Lo et al. | 361/679.27 |
| 7,492,421 B1 * | 2/2009 | Kim et al. | 349/58 |
| 7,518,671 B2 * | 4/2009 | Maruta | 349/58 |
| 2007/0263347 A1 * | 11/2007 | Hong et al. | 361/681 |
| 2008/0111942 A1 * | 5/2008 | Lee et al. | 349/58 |
| 2008/0192168 A1 * | 8/2008 | Sudo | 349/58 |
| 2009/0046217 A1 * | 2/2009 | Fukayama | 349/58 |
| 2009/0122221 A1 * | 5/2009 | Lee | 349/58 |
| 2009/0190062 A1 * | 7/2009 | Sudo | 349/58 |
| 2009/0237586 A1 * | 9/2009 | Han et al. | 349/58 |
| 2010/0315769 A1 * | 12/2010 | Mathew et al. | 361/679.29 |
| 2011/0007235 A1 * | 1/2011 | Chang | 349/58 |
| 2011/0025616 A1 * | 2/2011 | Lin | 345/173 |
| 2011/0221980 A1 * | 9/2011 | Kawabata et al. | 348/794 |

FOREIGN PATENT DOCUMENTS

CN            1257237 A        6/2000

* cited by examiner

*Primary Examiner* — Timothy L Rude
(74) *Attorney, Agent, or Firm* — Altis Law Group, Inc.

(57) ABSTRACT

An attachment frame for a display module includes a bezel in a periphery of the display module, and at least one pair of tabs integrally formed on inner sides of the bezel. Each tab includes a connecting portion connected to the bezel and a mounting portion fixed to the display module.

15 Claims, 4 Drawing Sheets

ATTACHMENT FRAME FOR A DISPLAY MODULE AND PORTABLE ELECTRONIC DEVICE USING THE SAME

CROSS-REFERENCE TO RELATED APPLICATION

This application is related to two co-pending U.S. patent application Ser. Nos. 12/961,697 and 12/961,701, and both entitled "ATTACHMENT FRAME FOR A DISPLAY MODULE AND PORTABLE ELECTRONIC DEVICE USING THE SAME". The inventor of the above co-pending applications is Bin Dai et al. The co-pending applications have the same assignee as the present application. The disclosures of the above-identified applications are incorporated herein by reference.

BACKGROUND

1. Technical Field

The present disclosure generally relates to an attachment frame for a display module such as a liquid crystal panel in a portable electronic device, and also relates to a portable electronic device, such as a tablet computer, using the attachment frame.

2. Description of the Related Art

As a result of increased demand for smaller portable electronic devices and improvements in performance of such devices, reduction of the external dimensions of such devices along with the increase of the amount of display information or the display area have been in higher demand. Such demand is particularly prevalent in smaller portable electronic devices using liquid crystal panels, including tablet computers.

Liquid crystal panels are often attached to a housing of a tablet computer by a bracket. The bracket includes a main connecting part and a plurality of tabs extending from the periphery thereof. The main connecting part and the tabs define a plurality of first mounting holes, and the display and the housing define a plurality of second mounting holes corresponding thereto. The liquid crystal panel, the bracket, and the housing are fixed together by a plurality of fasteners received in the corresponding first and second mounting holes. The main connecting part and the tabs are welded together, and requiring a special clamping device to position the connecting part and the tabs, thus creating difficulty in precise positioning.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

Figure 1:
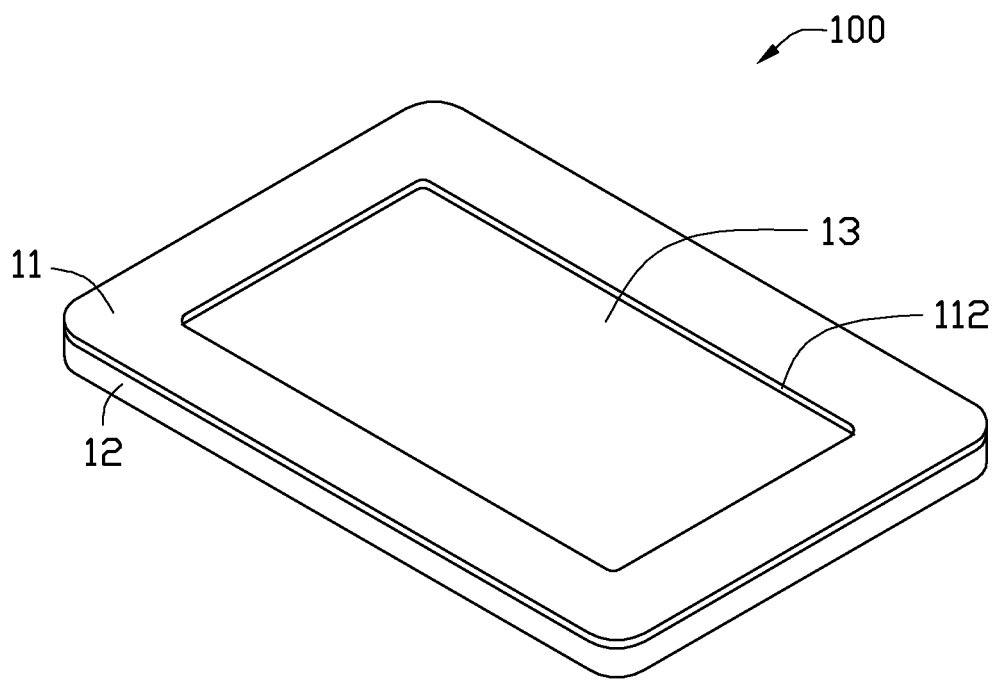
FIG. 1 is an assembled, isometric view of an embodiment of a portable electronic device including a bezel, a rear cover, a display module, and an attachment frame.
Figure 2:
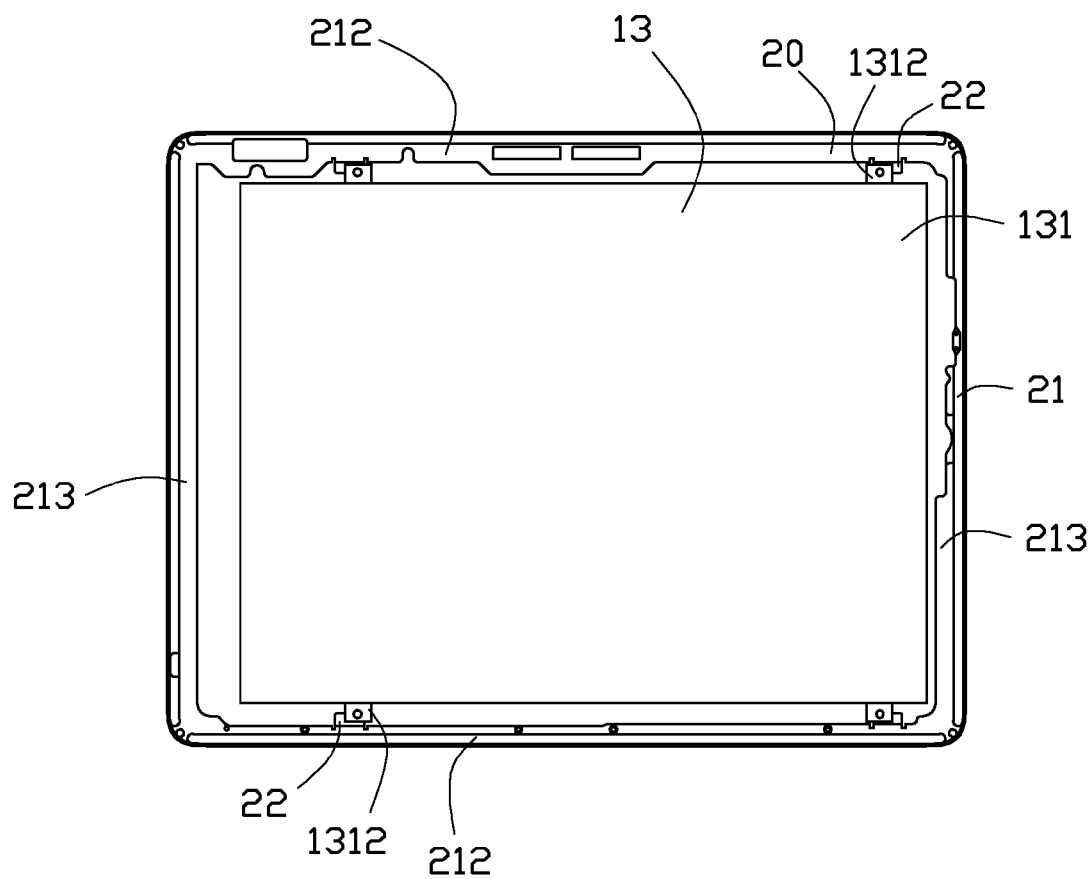
FIG. 2 is a vertical view of the display module and the attachment frame of FIG. 1, with the bezel being omitted.
Figure 3:
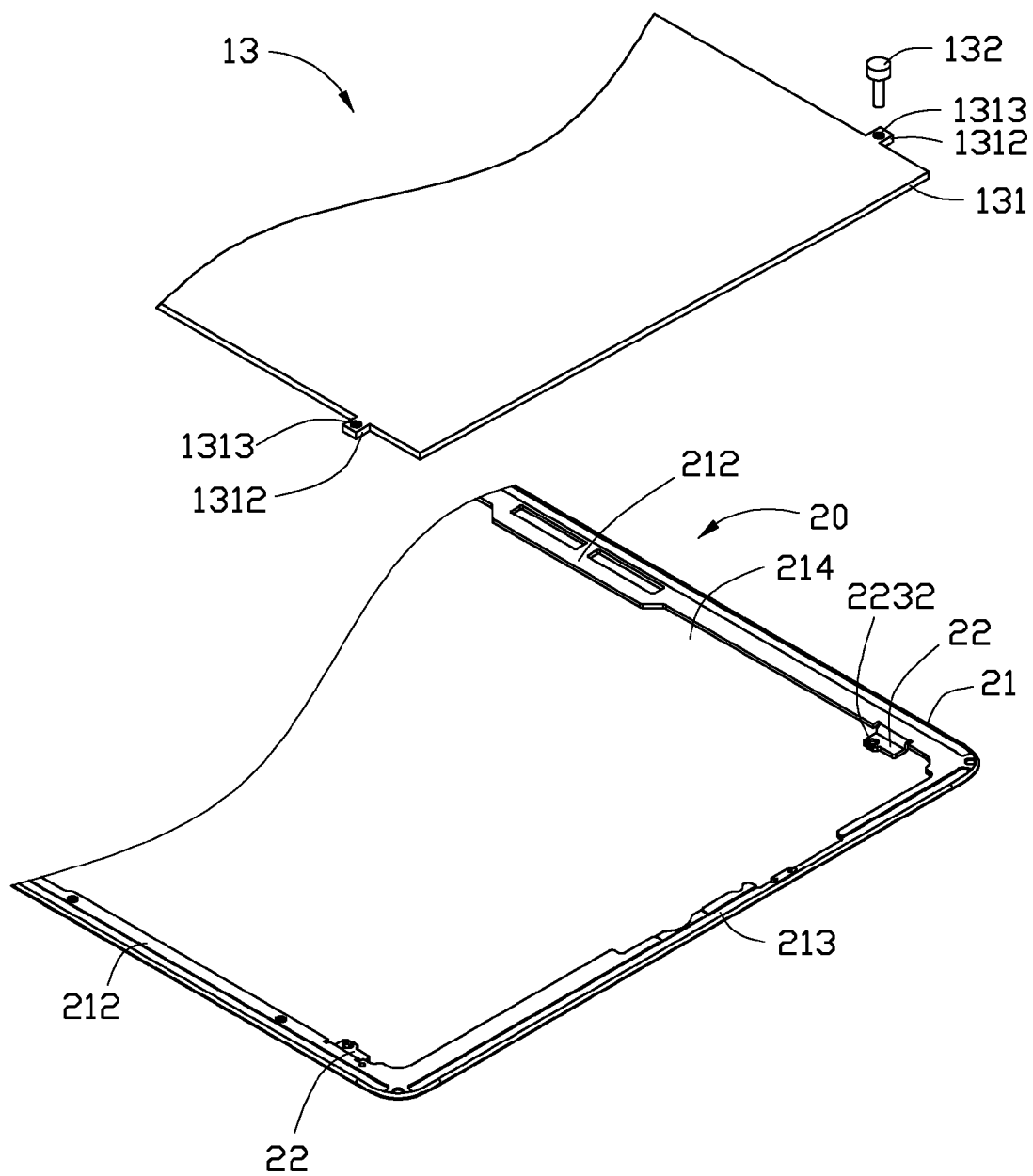
FIG. 3 is a partial, exploded, isometric view of the display module and the attachment frame of FIG. 2.

Referring to FIGS. 1 through 3, one embodiment of a portable electronic device 100 is a tablet computer including a first bezel 11, a rear cover 12, a display module 13, and an attachment frame 20 for attaching the display module 13 to the rear cover 12.

The first bezel 11 is substantially rectangular and defines a rectangular opening 112 for the display module 13. The first bezel 11 is fixed to the rear cover 12 in such a manner that the first bezel 11 and the rear cover 12 cooperatively define a receiving chamber (not labeled) therebetween to receive the display module 13.

The display module 13 includes a liquid display panel (not shown), a light guide plate (not shown), a light reflection plate (not shown), a light diffusion plate (not shown), and an outer frame 131 securing the foregoing components. The outer frame 131 includes four protruding portions 1312 extending from the periphery thereof, each of the protruding portions 1312 defining a first mounting hole 1313.

Figure 4:
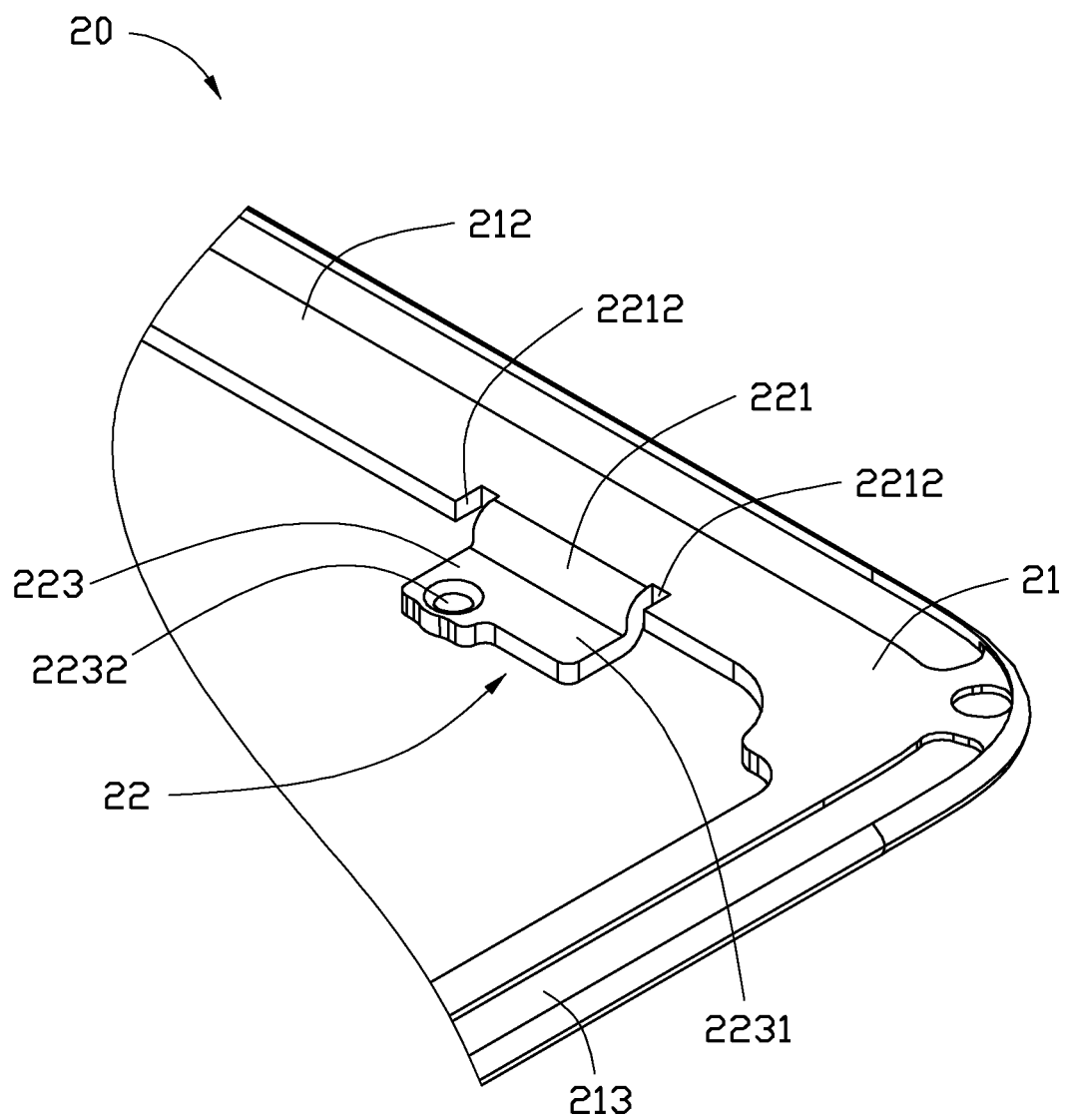
FIG. 4 is a partial, isometric view of one embodiment of an attachment frame, such as, for example, the attachment frame in FIG. 2.

Referring also to FIG. 4, the attachment frame 20 includes a second bezel 21 and two pairs of tabs 22. The tabs 22 are integrally formed on a plurality of inner sides of the second bezel 21. The attachment frame 20 attaches the display module 13 to the rear cover 12 and positions the display module 13 in the receiving chamber.

The second bezel 21, fixed to the rear cover 12, is substantially rectangular and includes a plurality of opposite first sidewalls 212 and a plurality of opposite second sidewalls 213. The first and second sidewalls 212, 213 cooperatively define a receiving bay 214. The receiving bay 214 has dimensions exceeding those of the display module 13 so as to receive the display module 13.

The tabs 22 cooperatively support the display module 13. Each tab 22 curves inward from the inner side of the second bezel 21, and includes a connecting portion 221 connected to the second bezel 21 and a mounting portion 223 fixed to the display module 13.

The mounting portion 223 is substantially flat and parallel to the second bezel 21. The mounting portion 223 has a top surface 2231 and a second mounting hole 2232 defined in the top surface 2231. The top surface 2231 is substantially parallel to the bottom surface of the second bezel 21. The second mounting holes 2232 correspond to the first mounting holes 1313 of the protruding portions 1312. The display module 13 is received in the receiving bay 214 on the top surface 2231 of the mounting portion 223, and a plurality of fasteners 132 is received in the corresponding first and second mounting holes 1313, 2232, and receiving the tabs 22, thus fixing the attachment frame 20 to the rear cover 12.

In the illustrated embodiment, the tabs 22 are formed by punching. Two opposite sides of the tab 22 define a plurality of cutouts 2212 to reduce the deformation of the tabs 22 associated with punching, so that the second bezel 21 and the tabs 22 are easily and accurately manufactured. The connecting portion 221 is depressed in the second bezel 21 and the mounting portion 223 is positioned below the bottom surface of the second bezel 21, such that the outer frame 131 can contact the inner sides of the second bezel 21 without interference with the connecting portions 221, and a compact structure can be obtained.

It should be understood that in other embodiments, the second bezel 21 and the tabs 22 can be integrally formed by die-casting or molding. The second bezel 21 and the tabs 22 can reach a higher contour accuracy by utilizing high-precision die-casting or molds.

It is believed that the present embodiments and their advantages will be understood from the foregoing description, and it will be apparent that various changes may be made thereto without departing from the spirit and scope of the embodiments or sacrificing all of its material advantages.

What is claimed is:

1. An attachment frame for a display module, the attachment frame comprising:
   a bezel arranged in a periphery of the display module; and
   at least one pair of tabs integrally formed in a plurality of inner sides of the bezel, wherein each tab comprising a connecting portion connected to the bezel and a mounting portion fixed to the display module, the connecting portion extends from the inner side of the bezel and bends downward and away from the display module, and the mounting portion is substantially flat and parallel to the bezel.

2. The attachment frame of claim 1, wherein the at least one pair of tabs are formed by punching.

3. The attachment frame of claim 2, wherein the opposite sides of each tab define a plurality of cutouts.

4. The attachment frame of claim 1, wherein each tab curves inward from the inner side of the bezel.

5. The attachment frame of claim 1, wherein the bezel is substantially rectangular and includes a plurality of opposite first sidewalls and a plurality of opposite second sidewalls, and the first and second sidewalls cooperatively define a receiving bay to receive the display module.

6. The attachment frame of claim 5, wherein the at least one pair of tabs are formed on the inner sides of the first sidewalls.

7. The attachment frame of claim 1, wherein the bezel and the at least one pair of tabs are integrally formed by die-casting or molding.

8. A portable electronic device comprising:
   a rear cover;
   a first bezel fixed to the rear cover, and cooperatively define a receiving chamber;
   a display module received in the receiving chamber; and
   an attachment frame for attaching the display module to the rear cover, the attachment frame comprising:
      a second bezel arranged in a periphery of the display module; and
      at least one pair of tabs integrally formed in a plurality of inner sides of the second bezel, and each tab comprising a connecting portion connected to the second bezel and a mounting portion fixed to the display module, wherein the connecting portion extends from the inner side of the bezel and bends downward and away from the display module, and the mounting portion is substantially flat and parallel to the bezel.

9. The portable electronic device of claim 8, further comprising a plurality of fasteners, wherein the display module comprises an outer frame forming a plurality of protruding portions protruding from a periphery thereof, each protruding portion defines a first mounting hole, the mounting portion defines a plurality of second mounting holes corresponding to the first mounting holes of the protruding portion, and the plurality of fasteners are received in the corresponding first and second mounting holes receiving the tabs.

10. The portable electronic device of claim 8, wherein the at least one pair of tabs are formed by punching.

11. The portable electronic device of claim 8, wherein the opposite sides of each tab define a plurality of cutouts.

12. The portable electronic of the device of claim 8, wherein each tab curves inward from the inner side of the second bezel.

13. The portable electronic device of claim 8, wherein the second bezel is substantially rectangular and includes a plurality of opposite first sidewalls and a plurality of opposite second sidewalls, and the first and second sidewalls cooperatively define a receiving bay to receive the display module.

14. The portable electronic device of claim 13, wherein the at least one pair of tabs are formed on the inner sides of the first sidewalls.

15. The portable electronic device of claim 8, wherein the bezel and the at least one pair of tabs are integrally formed by die-casting or molding.

* * * * *